April 21, 1959 P. B. BINDER 2,882,607
WHEEL ALIGNMENT GAGES
Filed June 14, 1957
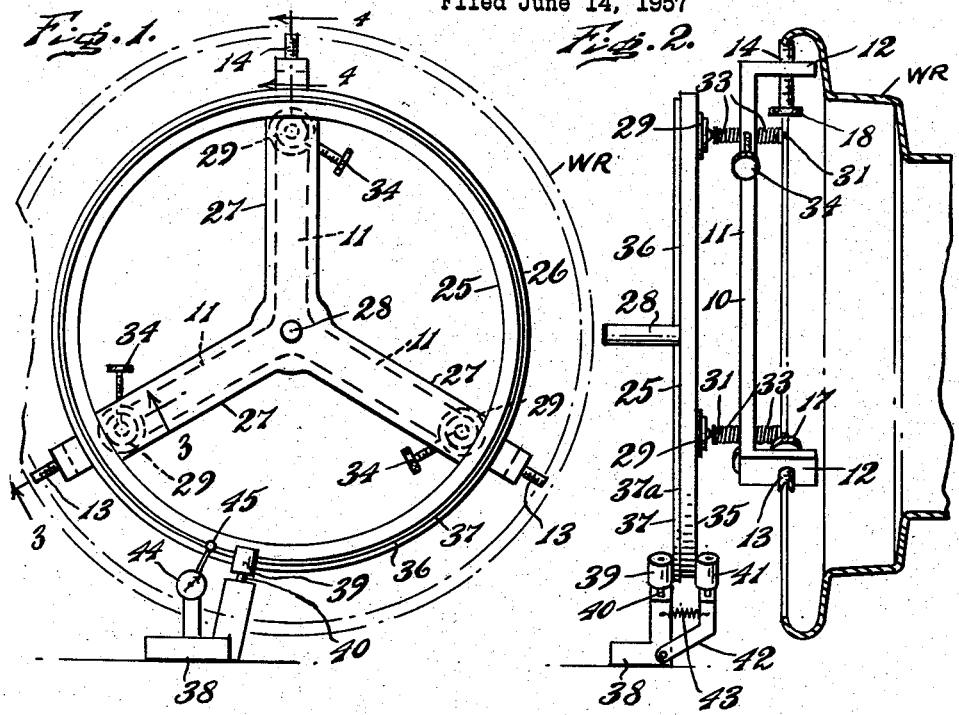
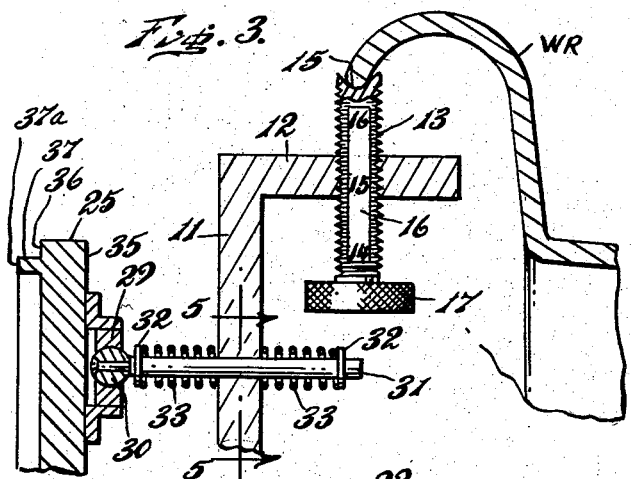
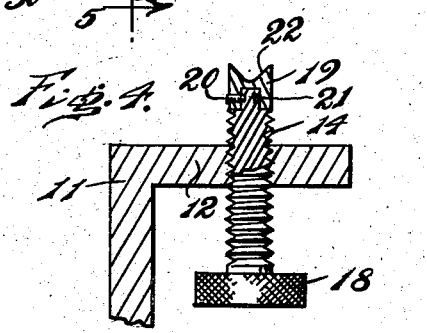
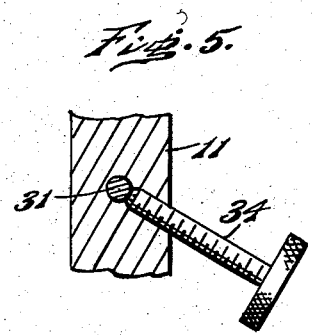
INVENTOR
Paul B. Binder
BY
ATTORNEY United States Patent Office 2,882,607
Patented Apr. 21, 1959

2,882,607

WHEEL ALIGNMENT GAGES

Paul B. Binder, North Wales, Pa.

Application June 14, 1957, Serial No. 665,847

5 Claims. (Cl. 33—203)

This invention relates to wheel alignment gages and more particularly to a gage for determining the actual plane of rotation of vehicle wheels.

Various wheel alignment gages have heretofore been proposed but none of these has proven wholly satisfactory. In some gages heretofore proposed for determining wheel alignment, the tires and/or rims of the wheels were used as reference points so that irregularities in the tires and/or rims introduced serious errors. In other gages heretofore proposed for determining wheel alignment the structure was unduly complicated and lacking in stability in use.

It is the principal object of the present invention to provide a wheel alignment gage which is simple and rugged in construction, reliable in its operation and which can be used with the warped rims and wheels to show the actual plane of rotation thereof.

It is a further object of the present invention to provide a wheel alignment gage which has a wide range of adaptability in use.

It is a further object of the present invention to provide a wheel alignment gage having a gaging element with improved adjusting structure therefor.

It is a further object to provide a wheel alignment gage having a supporting portion, clamped to and movable with a wheel rim, and a reference portion adjustably secured to the supporting portion and which is accessible and readily available for the necessary observations and measurements.

Other objects and advantageous features of the invention will be apparent from the description and claims.

The nature and characteristic features of the invention will be more readily understood from the following description, taken in connection with the accompanying drawings forming part hereof, in which:

Figure 1 is a front elevational view of a wheel alignment gage in accordance with the invention, the tire on the rim being omitted.

Fig. 2 is a side view of the structure shown in Fig. 1, the wheel rim being shown in section;

Fig. 3 is an enlarged sectional view taken approximately on the line 3—3 of Fig. 1;

Fig. 4 is a view similar to Fig. 3, taken approximately on the line 4—4 of Fig. 1; and Fig. 5 is a sectional view taken on the line 5—5 of Fig. 3.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to the drawings, the wheel alignment gage in accordance with the invention preferably includes a frame 10 in the form of a spider having three legs 11. Each of the legs 11, at its outer end, has a perpendicularly disposed securing portion 12 in which radially disposed clamping screws 13 and 14 are in threaded engagement.

The clamping screws 13, as shown in detail, in Fig. 3, have end slots 15 for engagement with the rim of the wheel to be gaged and have external indicia thereon, as at 16, for presetting in accordance with the rim diameter of the wheel to be gaged. The screws 13 have enlarged heads 17 for manual adjustment.

The screw 14 preferably is provided with an enlarged head 18 for manual adjustment and has a rotatably mounted end portion 19, held from endwise displacement by a pin 20 engaged in an annular groove 21. The end portion 19 has an end slot 22 for engagement with the rim WR of the wheel to be gaged, the rotatable mounting of the end portion 19 permitting tightening of the screw 14 with the slot 22 engaging the wheel rim WR.

A gaging plate 25 is provided, having an annular rim 26 with radial arms 27 extending inwardly therefrom. The arms 27, at the central portion thereof, can be provided with a stub shaft 28, the longitudinal axis of which is perpendicular to the plane of the gaging plate 25.

The shaft 28 can be employed with types of wheel gaging equipment now available.

The gaging plate 25, inwardly of the outer margin of the rim 26, is provided with a plurality of ball sockets 29 for the reception of spherical heads 30, on positioning pins 31. The pins 31 extend through the legs 11, and have mounted thereon spaced abutment rings 32 on opposite sides of the legs 11. Springs 33 interposed between the side faces of each of the legs 11 and the abutment rings 32 serve to tentatively or preliminarily position the gaging plate 25 with respect to the frame 10. Thumb screws 34, extending through the legs 11 and engaging the pins 31 are provided for holding the pins 31, as hereinafter explained.

The rim 26 has an inner flat finished face 35 in a plane and an outer flat face 36 from which an annular flange 37 extends.

The outer face 37a of the flange 37 is preferably finished in a plane for gaging purposes and this plane is preferably parallel to the plane of the face 36. The plane of the face 35 or that of the face 37a of the flange 37, or both, can serve as reference planes for gaging purposes.

The ball sockets 29 are preferably located so as to be inwardly with respect to the flange 37, to permit of a free rotation of the rim 26 without obstruction by the sockets 29.

A reference base or frame 38 may be provided, placed upon the floor of the location at which the wheel alignment gage is to be used.

The base 38 has a roller 39 for engagement with the face 37a of the flange 37 mounted thereon on a fixedly mounted shaft 40, and a roller 41 for engagement with the rim face 35 carried on a bracket 42. The bracket 42 is pivotally mounted on the base 38 and is urged towards the face 35 by a spring 43.

The base 38, if desired, can also have an indicating dial type gage 44 carried thereon and provided with an actuating arm 45 for engagement with the flange face 37a.

The mode of use will now be pointed out.

With the clamping screws 13 preset in accordance with the size of the rim WR of the wheel whose alignment is to be checked, and with their end slots 15 engaging the rim WR, the clamping screw 14 is tightened by turning its head 18 and with its end slot 21 engaging the rim WR of the wheel. In this manner the clamping frame 10 can be rigidly mounted and held with respect to the wheel rim WR. The wheel rim WR both by reason of conditions arising during manufacture and conditions encountered in use will be warped and will impart its warped shape to the tire mounted thereon.

The gaging plate 25, preliminarily positioned by the springs 33 with respect to the frame 10, can be adjusted so that the reference plane in which the face 37a is disposed is parallel to the actual plane of rotation of the wheel. To effect this adjustment the roller 39 on the frame 36 is held against the flange face 37a and the thumb screws 34 successively tightened as the plate 25 is positioned by the engagement of the roller 39.

The rim 26 of the gaging plate 25 can then, if desired, be used for direct measurement of the offsetting of the plane thereof with respect to the three perpendicular axes. The stub shaft 28 can also be utilized, if desired, for measurement of its position.

The actual plane of rotation of warped wheels and rims as well as those substantially free from such irregularities can be ascertained in a manner not heretofore possible.

I claim:

1. A wheel alignment gage comprising a rim clamping frame having a plurality of radially disposed legs, clamping members carried by said legs and extending radially for engagement with a wheel rim, a gaging plate having a rim portion in a plane and radially inwardly extending arms, connecting pins interposed between said plate and said frame, pivotal connections between said pins and said plate, sliding connections between said pins and said frame and members for locking said sliding connections.

2. A wheel alignment gage as defined in claim 1 in which a base member is provided having portions for continuous rotational engagement with said plane portion of said gaging plate rim.

3. A wheel alignment gage as defined in claim 1 in which said gaging plate has a stub shaft extending perpendicularly therefrom at the rotational axis thereof.

4. A wheel alignment gage as defined in claim 1 in which said pins have resilient members thereon engaging opposed portions of said frame, and said members for locking are in threaded engagement in said frame.

5. A wheel alignment gage as defined in claim 1 in which a base member is provided having rotatable portions one of which is in a fixed plane, and the other of which is resiliently urged towards the first, said rotatable portions being disposed in rotational engagement with opposed faces of said gaping plate rim.

References Cited in the file of this patent

UNITED STATES PATENTS

| | | |
|---|---|---|
| 2,595,604 | Pascoe | May 6, 1952 |
| 2,675,200 | Wohlforth | Apr. 13, 1954 |